PROPANE FEED
38% COBALT ON KIESELGUHR $1\mu$ $1mm = 200 Å$

PROPANE FEED
10% COBALT ON ALUMINA

|— 1μ —|
1 mm = 200 Å

PROPANE FEED
13% COBALT ON $SiO_2$

1μ
1mm = 200 Å

PROPANE FEED
56% NICKEL ON KIESELGUHR $1\mu$
1mm = 200 Å

FEF CARBON BLACK

1μ
1mm = 200 Å

United States Patent Office 3,816,609
Patented June 11, 1974

3,816,609
PROCESS FOR PRODUCING A GASEOUS COMPOSITION CONTAINING HYDROGEN OR HYDROGEN AND CARBON OXIDES
Glen P. Hamner, Baton Rouge, La., assignor to Esso Research and Engineering Company
Continuation-in-part of abandoned application Ser. No. 40,057, May 25, 1970. This application Mar. 24, 1972, Ser. No. 237,972
Int. Cl. C01b 1/02, 1/18
U.S. Cl. 423—652
12 Claims

ABSTRACT OF THE DISCLOSURE

Hydrocarbons are converted to a hydrogen-rich gas stream by first producing a carbonaceous catalytic system having long, thin, coil-like carbon fibers, one end of which is attached to a Group VIII, non-noble metal composition, and then contacting the catalytic carbon with steam at a temperature between 800° and 1200° F.

RELATED APPLICATIONS

This is a continuation-in-part of Ser. No. 40,057, filed May 25, 1970, now abandoned.

BACKGROUND OF THE INVENTION

The present invention relates to the conversion of hydrocarbons to a hydrogen-rich gas stream.

It is known that heavy hydrocarbons such as vacuum distillation bottoms can be converted to coke and this coke steam-treated to produce a hydrogen-rich gas.

It is also known that lighter hydrocarbons can be converted into small spheres of carbon which join together to form chains. It is further known that these spheres can be steam treated to produce a hydrogen-rich gas stream.

While these prior art processes do effectively convert hydrocarbons to a hydrogen-rich gas stream, it would be desirable to have a conversion process that can achieve at least as effective gasification at much lower temperature than the present processes while maintaining the hydrogen content of the stream at high levels.

These and other advantages and objectives can be achieved by the process of this invention as more fully described below.

SUMMARY OF THE INVENTION

Accordingly, it has been found that hydrocarbons can be converted to a hydrogen-rich gas stream by contacting the hydrocarbons with a supported, Group VIII non-noble metal at a temperature between 600° and 1200° F. to produce a carbonaceous catalyitc system having long, thin, coil-like carbon fibers, at least one end of which is attached to the supported, Group VIII, non-noble metal. The carbon materials is then contacted with steam at a temperature between 800° and 1200° F., preferably between 950° and 1150° F. to produce the hydrogen-rich gas stream.

PREFERRED EMBODIMENTS OF THE INVENTION

In accordance with the invention, a hydrocarbon is introduced into a reaction zone and contacted with a supported Group VIII, non-noble metal (i.e., iron, cobalt, nickel or combinations thereof) at a temperature between 600° and 1200° F. Most any hydrocarbon can be used as a feed to the reaction zone, by way of example, methane, ethane, ethylene, propane, propylene, butane, butene-1, butene-2, pentane, amylene, hexane and methylcyclohexane, light virgin naphtha or even heavier liquid petroleum fractions. It is, however, preferred that lighter hydrocarbons are used, such as hydrocarbons having less than about 15 carbon atoms per molecule. Particularly preferable are hydrocarbons having less than about 7 carbon atoms per molecule, such as pentane, butane and propane.

The contacting temperature is generally between 600° and 950° F., except that when methane is used, a temperature of about above 950° F. is preferable for thermodynamic considerations.

Figure 1:
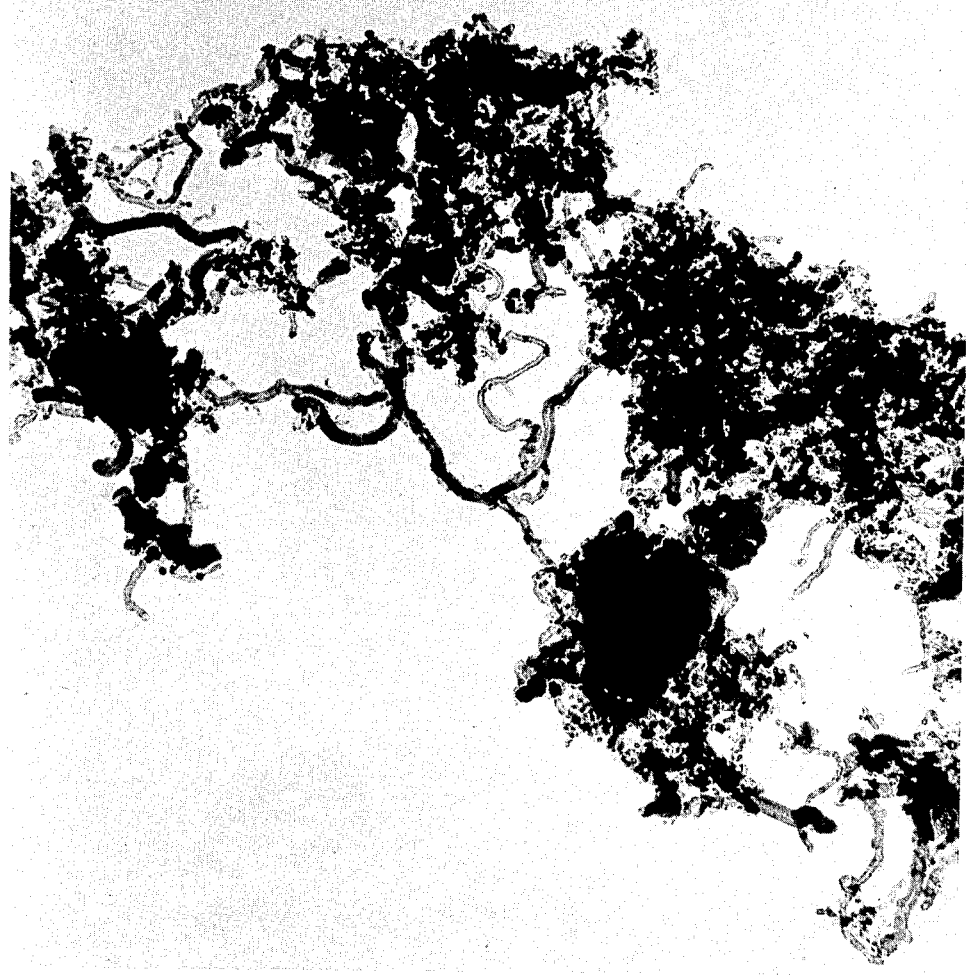
FIG. 1 is a photomicrograph of the 28% cobalt on kieselguhr catalyst made from propane and used in the steam gasification step of this invention.
Figure 2:
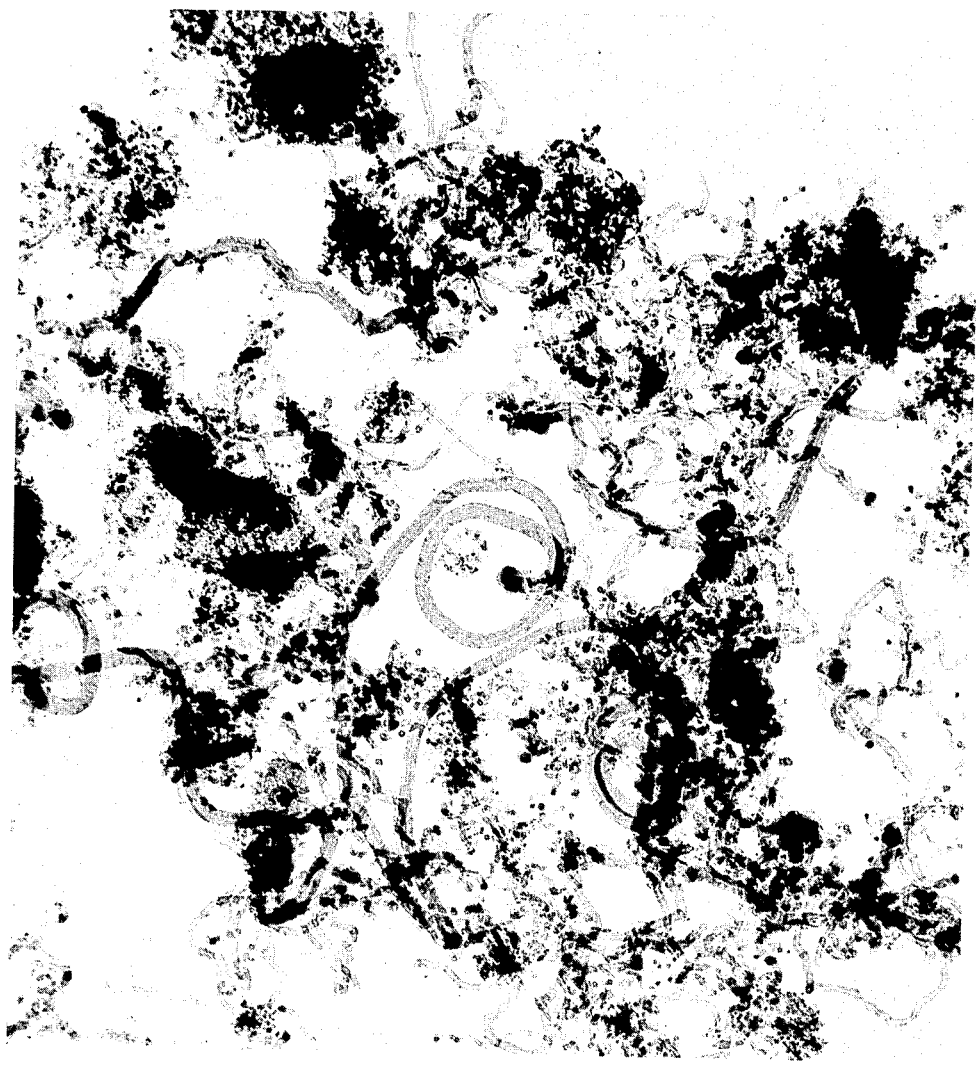
FIG. 2 is a photomicrograph of the 10% cobalt on alumina catalyst made from propane.
Figure 3:
FIG. 3 is a photomicrograph of the 13% cobalt on silica catalyst made from propane.
Figure 4:
FIG. 4 is a photomicrograph of the 56% nickel on kieselguhr catalyst made from propane.
Figure 5:
FIG. 5 is a photomicrograph of FEF carbon black which is presented for comparison to the catalyst material of this invention as shown in FIGS. 1–4.

The reaction of the hydrocarbon with the supported Group VIII, non-noble metal results in the formation of a steam gasification catalyst characterized by having long, thin, coil-like carbon fibers, at least one end of which is attached to the supported Group VIII, non-noble metal. The length of the fibers will be varied, but it is preferred that the fibers be of an average length wherein the weight of the carbon in the fibers is at least 10% greater, and most preferably 50% greater, than the weight of the supported metal to which it is attached. This is in contrast to a typical FEF carbon black material (as seen in FIG. 5) which consists of small spheres of solid carbon linked together in chains.

The Group VIII, non-noble metals may be supported on any conventional support materials which are inert to the metals supported. Examples would include kieselguhr, silicia, pumice, alumina and silica-alumina as well as like-type supports. As is seen in FIGS. 1–4, the support will influence the thickness of the coil-like fibers.

The catalyst system formed according to the above description has been found to be an excellent feed to a steam gasification process in that extremely high activity rates are achieved at unusually low temperatures while producing a hydrogen-rich gas stream, in particular, a gas stream containing more than 50 mol. percent of hydrogen on a dry basis. This catalyst system is further desirable in that the ratio of carbon dioxide to carbon monoxide to carbon monoxide formed is greater than 1. This means that a hydrogen stream containing more than 95 mol. percent $H_2$ (on a dry basis) can be obtained in a subsequent conventional shift process step wherein the carbon monoxide is converted to hydrogen and additional carbon dioxide (which is easily removed by conventional means such as absorption in caustic) by the following reaction:

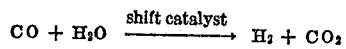

Accordingly, the catalyst system of this invention is treated with steam at a temperature between 800° and 1200° F., preferably between 950° and 1150° F. If desired, pressure up to 1500 p.s.i.g. may be employed. Steam rates may be varied between about 10 and about 100 wt./hr./wt. of carbon in the reaction zone such that the gas velocity is in the order of 0.05 to 1.0 ft./sec. Preferred steam rates are between 20 to 50 wt./hr./wt. of carbon.

The following examples are illustrative of the advantages and features of this invention.

EXAMPLE 1

Propane was introduced at 930° F., atmospheric pressure and at a feed rate of 3.9 w./hr./w. based on the nickel-silica support into a reaction zone containing nickel supported on kieselguhr to produce a carbon mass having long, thin, coil-like carbon fibers attached to supported nickel (nickel on kieselguhr). In the same manner a catalytic carbon mass having long, thin, coil-like carbon fibers attached to supported cobalt (cobalt on kieselguhr) was produced when operating at 650–825° F., atmospheric pressure and at a gaseous feed rate of 150 v./v./hr. based on Co-silica support within the reaction zone. Higher temperatures such as 900–1050° F. were required when feeding methane.

There are also large differences amon the carbon fibers or carbon strands produced with the Group VIII metals and their support. Carbon of the art FEF Black is made up of small spheres joined together in a chain-like fashion. The carbon fibers or strands vary in physical dimensions depending on the support material that the Group VIII metals are deposited. A silica support produces the larger strands or fibers and the alumina support produces a much finer or smaller carbon fiber or strand. The measured average strand or fiber diameter and surface area for carbon fiber on Co-silica support being 200 A. and 140 m.$^2$/g., respectively. By comparison, with a Co-alumina carbon fiber the carbon fiber is considerably less than 200 A. In general, carbon fibers produced on a nickel support (silica or alumina) will be less in fiber diameter than those produced from a cobalt support.

These fibrous strand-like carbon masses attached to a Group VIII metal support were then contacted with steam at temperatures between 1050° and 1200° F. and at a steam rate between 20 and 50 wt./hr./wt. to produce a hydrogen-rich gas steam. The following data were obtained.

STEAM GASIFICATION OF CATALYTIC CARBON BLACK
[Excess steam]

| Run number | 1 | 2 | 3 |
|---|---|---|---|
| Metal | Cobalt [1] | | [2] Nicke |
| Grams charged | 6.8 | 6.8 | 8.0 |
| Grams recovered | 0.7 | 1.2 | 5.4 |
| Time, hours | 1 | 2 | 3.5 |
| Temperature, °F | 1,190 | 1,050 | 1,160 |
| Gas, s.c.f. | 1.05 | 0.72 | 0.46 |
| Gas composition, mol percent (dry): | | | |
| $H_2$ | 57.6 | 59.6 | 63.5 |
| CO | 17.2 | 9.9 | 7.7 |
| $CO_2$ | 22.2 | 27.2 | 27.6 |
| $C_1$ | 3.0 | 3.3 | 1.2 |

[1] Approximately 3% cobalt.
[2] Approximately 1.5% nickel.

EXAMPLE 2

Comparative steam gasification runs were made between a Co-silica and Ni-silica fibrous carbon mass of this invention and a typical FEF carbon black material, unpromoted, Co and K promoted, and carbon deposited on metal alumina supports and a metal oxide. In particular, all materials were subjected to a steam rate of 50 wt./hr./wt. at temperatures of 1050–1375° F. for a period of 1 to 3.5 hours. These results are given below.

As seen from the above table, the catalytic fibrous carbon of this invention achieved a far greater percent gasification at the low temperature of 1050° F. then even the well-known Co-Mo-alumina gasification catalyst (82.2% vs. 63%) at 100° F. higher conditions. It should also be noted FEF Black system even promoted would not achieve a percent gasification greater than about 33.8% even at 100° F. higher temperatures.

Having described and illustrated the invention, what I claim as new, novel, useful and unobvious is:

1. A process for producing a gaseous composition containing hydrogen and carbon oxides, which comprises:
   contacting a carbonaceous catalytic system having long, thin, coil-like carbon fibers of an average diameter up to 200 A. and a surface area up to 140 m.$^2$/g., at least one end of said fibers being attached to a supported Group VIII, non-noble metal, with steam at a temperature between about 800° and about 1200° F.

2. A process according to claim 1 wherein said carbon fibers have an average weight 50% greater than said supported metal to which said carbon fibers are attached.

3. A process according to claim 1 wherein said steam is contacted with said system at a rate between 10 to 100 wt./hr./wt. of carbon.

4. A process according to claim 1 wherein said metal is supported on alumina, silica-alumina, kieselguhr or pumice.

5. A process for converting carbonaceous material to a gaseous composition containing hydrogen and carbon oxides, which comprises:
   (a) contacting said carbonaceous material with a supported Group VIII non-noble metal in a reaction zone oprating at temperatures between about 600° and about 1200° F., said contacting being for a time sufficient to produce a carbonaceous catalytic system having long, thin, coil-like carbon fibers of an average diameter up to 200 A. and a surface area up to 140 m.$^2$/g., at least one end of said fibers being attached to said supported metal; and
   (b) contacting the carbonaceous catalytic system with steam at a temperature between about 800° and about 1200° F. to produce said gaseous composition.

6. A process according to claim 5 wherein said carbonaceous material is a hydrocarbon having less than about 7 carbon atoms per molecule.

7. A process according to claim 5 wherein said carbon fibers have an average weight 50% greater than said supported metal to which said carbon fibers are attached.

8. A process according to claim 5 wherein said steam is contacted with said system at a rate between about 10 and about 100 wt./hr./wt. of carbon.

9. The process of claim 1 wherein said supported Group VIII metal is cobalt supported on silica, said carbon fibers having an average diameter of 200 A. and a surface area of 140 m.$^2$/g.

10. A process for producing a gaseous composition containing more than 95 mole percent hydrogen on a dry basis, which comprises:
    (a) contacting a carbonaceous catalytic system having long, thin, coil-like carbon fibers of an average diam-

COMPARATIVE STEAM GASIFICATION RATES

| | Carbon source | | | | | | | | | |
|---|---|---|---|---|---|---|---|---|---|---|
| | FEF black [1] | | | Catalytic fibrous carbon | | 10% carbon on catalyst [2] | | | 5% carbon on $Fe_2O_3$ | |
| Promoter | None | Co-salt | K-salt | Cobalt-silica | | Ni-Mo-alumina [3] | | Co-Mo-alumina [3] | | $Fe_2O_3$ | |
| Wt. percent promoter as metal | | 5.0 | 2.5 | 5.0 | | 15–18 | | 12–15 | | 90 | |
| Temperature of steam gasification, °F | 1,175 | 1,175 | 1,175 | 1,190 | 1,050 | 1,050 | 1,375 | 1,150 | 1,375 | 1,050 | 1,375 |
| Time steamed, [4] hours | 2 | 2 | 2 | 1 | 2 | 2 | 2 | 2 | 2 | 2 | 2 |
| Percent gasification | Nil | <5 | 33.8 | 89.3 | 82.2 | <10 | 99 | 63 | 99 | <10 | 96 |

[1] Carbon black formed to 14–35 mesh aggregate.
[2] Carbon deposited on catalyst by passing n-heptane over the catalytic support at 1,000° F.
[3] Alumina support contained 7% $SiO_2$ and 1.5% $SiO_2$ for the Ni and Co catalyst, respectively.
[4] Excess steam, 50 wt. percent on original carbon charge.

eter up to 200 A. and a surface area up to 140 m.²/g., at least one end of said fibers being attached to a supported Group VIII, non-noble metal, with steam at a temperature between about 800° and about 1200° F. to produce a gaseous composition containing hydrogen and carbon monoxide;
(b) contacting said gaseous composition with a shift catalyst under shift process conditions to convert at least a portion of said carbon monoxide to carbon dioxide; and
(c) removing said carbon dioxide from said gaseous composition resulting from step (b) to produce a gaseous composition containing more than 95 mole percent on a dry basis.

11. The process of claim 10, wherein said supported Group VIII metal is cobalt supported on silica, said carbon fibers having an average diameter of 200 A. and a surface area of 140 m.²/g.

12. The process of claim 5, wherein said supported Group VIII metal is cobalt supported on silica, said carbon fibers having an average diameter of 200 A. and a surface area of 140 m.²/g.

References Cited
UNITED STATES PATENTS

| | | | |
|---|---|---|---|
| 1,926,587 | 9/1933 | Hansgirg | 423—656 |
| 3,053,775 | 9/1962 | Abbott | 252—421 |
| 3,213,026 | 10/1965 | Jordan et al. | 252—62.55 |
| 3,363,987 | 1/1968 | Hayes | 423—651 |
| 3,440,177 | 4/1969 | Patton et al. | 252—373 |
| 3,527,714 | 9/1970 | Hambling et al. | 252—413 |

EDWARD STERN, Primary Examiner

U.S. Cl. X.R.

252—373, 472, 477; 423—618, 635